United States Patent
Sato et al.

[11] Patent Number: 5,781,528
[45] Date of Patent: Jul. 14, 1998

[54] PATH SWITCHING SYSTEM AND METHOD

[75] Inventors: Yasuyuki Sato, Iwate-gun; Keiji Miyazaki, Kawasaki; Yasuki Fujii, Kawasaki; Mitsuhiro Azuma, Kawasaki; Takafumi Chujo, Kawasaki, all of Japan

[73] Assignee: Fujitsu Limited, Kanagawa, Japan

[21] Appl. No.: 543,025

[22] Filed: Oct. 13, 1995

[30] Foreign Application Priority Data

Jan. 13, 1995 [JP] Japan ................... 7-003867

[51] Int. Cl.⁶ .................................. H04L 1/00
[52] U.S. Cl. .................. 370/218; 370/397; 370/400; 340/827; 395/182.02
[58] Field of Search .................. 370/16, 16.1, 94.2, 370/216, 217, 218, 221, 225, 226, 241, 242, 244, 247, 248, 250, 252, 395, 396, 397, 398, 399, 400, 409; 340/825.01, 826, 827, 825.03; 395/181, 182.01, 182.02

[56] References Cited

U.S. PATENT DOCUMENTS

| | | | |
|---|---|---|---|
| 5,016,243 | 5/1991 | Fite, Jr. .................. | 370/16 |
| 5,218,601 | 6/1993 | Chujo et al. .................. | 370/16 |
| 5,239,537 | 8/1993 | Sakauchi .................. | 370/16 |
| 5,241,534 | 8/1993 | Omuro et al. .................. | 370/16 |
| 5,412,376 | 5/1995 | Chujo et al. .................. | 340/825.01 |

FOREIGN PATENT DOCUMENTS 5114910   5/1993   Japan.

*Primary Examiner*—Alpus H. Hsu
*Assistant Examiner*—Kwang B. Yao
*Attorney, Agent, or Firm*—Helfgott & Karas, P.C.

[57] ABSTRACT

A path switching system and method for a multiple-node ATM network, in which a plurality of paths can be simultaneously switched preserving proper correspondence thereof. A key choosing unit provided in a node chooses first and second sorting keys out of the virtual paths between the nodes, based on a first and second path information stored in a path information memory unit. Two nodes located at both ends of the route failed due to trouble in the ATM network select a first pair of isolated virtual paths having the first sorting key, which were formerly connected to the failed route, and connect them to a first bypass route. The two nodes then connect in a similar way a second pair of isolated virtual paths both having the second sorting key to a second bypass route.

8 Claims, 11 Drawing Sheets

```
V P Table #2

```
VPTable # 1
1. (X_7_2)_33_(4_1_1)_26_(3_2_2)
2. (X_7_2)_63_(4_1_1)_30_(3_2_1)_83_(3_3_1)
3. (X_8_1)_128_(3_1_1)_12_(3_2_1)_54_(3_3_2)
```

FIG. 5

VPTable #3

| No. | Node# | VPI# | Node# | ---- | Node# | VPI# | Node# |
|---|---|---|---|---|---|---|---|
| 1 | 1 | 1 | 2 | ---- | 3 | 10 | 4 |
| 2 | 1 | 2 | 2 | ---- | 3 | 7 | 4 |

FIG. 10

PATH SWITCHING SYSTEM AND METHOD

BACKGROUND OF THE INVENTION

1. Field of the Invention

The present invention relates to a path switching system and method for a multiple-node ATM (Asynchronous Transfer Mode) network, and more specifically, to a path switching system and method for an ATM network incorporating a path-failure recovery process, which simultaneously restores a plurality of paths after searching for a bundle of bypass routes, for realizing faster restoration of communication channels by introducing distributed control techniques in an automatic network recovery.

2. Description of the Related Art

According to ultra-high-speed data transmission technologies having been operational these years, the area to be affected by a trouble happened in a part of network seems to have become wider than ever. In particular, a trouble in a network node due to a disaster as fire or earthquake, although it rarely happens, tends to stop more communications channels when compared with the case of a link trouble. Prompt restoration is therefore in common demand so as to deal with troubles not only in a single link but in a node or multiple links as well.

In order to accomplish faster path restoration, there are some methods used to recover a plurality of failed paths in a single process.

Some conventional methods use such a path-bundling technique that finds a bundle of paths at a time. According to those methods, if some trouble has happened with a node or a link, one of the nodes that has detected the trouble is nominated to be a sender node and this sender node broadcasts to other nodes over the network a path-searching message to initiate a search for new routes which would bypass all the failed paths (i.e., bypass routes). Consequently, a node facing the sender node beyond the defective paths, which is called a chooser node, sends a path-reservation message to reserve the bypass routes and then responds to the sender node via the bypass routes. The sender node, on reception of the response, sends a path-switching message through the reserved bypass routes and the nodes located on the bypass routes sequentially re-establish the paths.

This kind of path restoration method is described in detail in Japanese Patent Application No. H6(1994)-49554 "Ukaikeiro Tansaku Houshiki" (Bypass Route Searching System) invented by the same applicant as the present invention's.

The conventional path restoration method, however, has a drawback as follows in reconfiguring a plurality of paths with a single path-switching message. That is to say, the method could cause an improper connection between bypass routes and isolated paths which were once connected with the failed paths but now isolated by the trouble.

For example, FIG. 11 shows that there are two active routes: a first active route which runs from a virtual path 101 to another virtual path 105 through nodes 102, 103, and 104, and a second active route which runs from a virtual path 106 to another virtual path 107 through nodes 102, 103, and 104.

Assume that a trouble has arisen in the node 103 and two bypass routes are prepared to backup the above active routes. FIG. 11 show that a first bypass route is created from a virtual path 108 to a virtual path 110 via a node 109, and a second bypass route is similarly created from a virtual path 111 to a virtual path 112 via a node 109.

However, a correct bypass route to substitute the first active route should be a route from the virtual path 101 to the virtual path 105 through the node 102, the virtual path 108, the node 109, the virtual path 110 and the node 104. Similarly, a correct bypass route that serves as an alternative course for the second active route should be a route from the virtual path 106 to the virtual path 107 through the node 102, the virtual path 111, the node 109, the virtual path 112, and the node 104. The FIG. 11 suggests that improper path switchings could happen at a relaying node (i.e., the node 104) in a process of multi-path switching and it would result in erroneous connections such as the connection between the virtual paths 101 and 107 as well as between the paths 106 and 105.

This kind of erroneous bypass connection could occur also in case that a plurality of failures happened at different locations almost at the same time. For example, FIG. 11 shows a third active route, in addition to the first and second active routes, which runs from a virtual path 113 to virtual path 117 through the node 102, a virtual path 114, a node 115, a virtual path 116, and the node 104. Assume that the node 103 and the node 115 have failed at the same time and a third bypass route was prepared for connecting between the virtual paths 118 and 119 via the node 109, in addition to the above-described first and second bypass routes. An alternative path connection process to substitute the first active route subsequently began from the left to right in FIG. 11 thus connecting the virtual path 101 to the virtual path 108 via the node 102, and at nearly the same time, another path connection process started from the right to left in FIG. 11 to bypass the third active route. In such a case, the virtual path 117 could be connected to the virtual path 110 instead of the virtual path 119 via the node 104. As a result, the system falls into an erroneous situation that the first bypass route is shared by two different active routes at the both ends at a time.

SUMMARY OF THE INVENTION

Taking the above into consideration, an object of the present invention is to provide a path switching system and method, which can simultaneously switch a plurality of paths keeping proper correspondence in their connections.

To accomplish the above object, according to the present invention, there is provided a path switching system for an ATM network which contains a plurality of nodes. This path switching system is actually distributed in the nodes and each node comprises path information memory means, key choosing means, and connection means.

The path information memory means stores path information for an active route in service of communications. The path information is descriptive of a partial linkage structure within at least two-node distance from the node. When a trouble occurred in a part of the active route, the key choosing means chooses one of constituents of a failed route as a sorting key in reference to the path information corresponding therewith. The connection means, when the node is located either end of the failed route and perform path switching operations to the bypass route, connects a pair of isolated routes having an identical sorting key to a bypass route. This pair of isolated routes are selected from isolated routes which were formerly connected to the failed route.

To accomplish the above object, there is also provided a path switching method for an ATM network which contains a plurality of nodes.

The method comprises the following three steps of:

(a) memorizing path information for an active route in service of communications, which is descriptive of a partial linkage structure within at least two-node distance from each node;

3

(b) choosing a sorting key, in reference to the path information, out of constituent paths of a failed route, when a trouble occurred in a part of the active route; and (c) making a pair of nodes connect a pair of routes having an identical sorting key to a single bypass route, wherein the pair of nodes are located at respective ends of the failed route and perform path switching operations to the bypass route.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows contents of a VP table of a node 22;

FIG. 5 shows contents of a VP table of a node 21;

FIG. 6 shows contents of a VP table of a node 23;

FIG. 10 illustrates a VP table; and

DESCRIPTION OF THE PREFERRED EMBODIMENTS

An embodiment of the present invention to accomplish the above-described objects will be first outlined below with reference to FIG. 1.

According to the present invention, each node in the system comprises path information memory means 1, key choosing means 2, and connection means 3. The path information memory means 1 stores path information, which indicates a part of an active route, describing linkage structures within at least two-node distance from each node. In case that some fault has happened in a part of the active routes, the key choosing means 2 chooses a sorting key to be one constituent of the failed route. The connection means 3, when the node is located either end of the failed route and responsible to switch relevant paths to bypass routes, interconnects each bypass route with each pair of isolated routes having an identical sorting key in their path information, wherein the pair of isolated routes were once connected to but now remain isolated by the failed route.

The system also comprises virtual path selection means 4, 4a, and 4b in respective nodes. When the node is located on the bypass route, the virtual path selection means selects either one of a plurality of virtual paths connecting the node to its adjacent nodes, based on a numerical order of node identification numbers of the node and its adjacent nodes.

Figure 1:
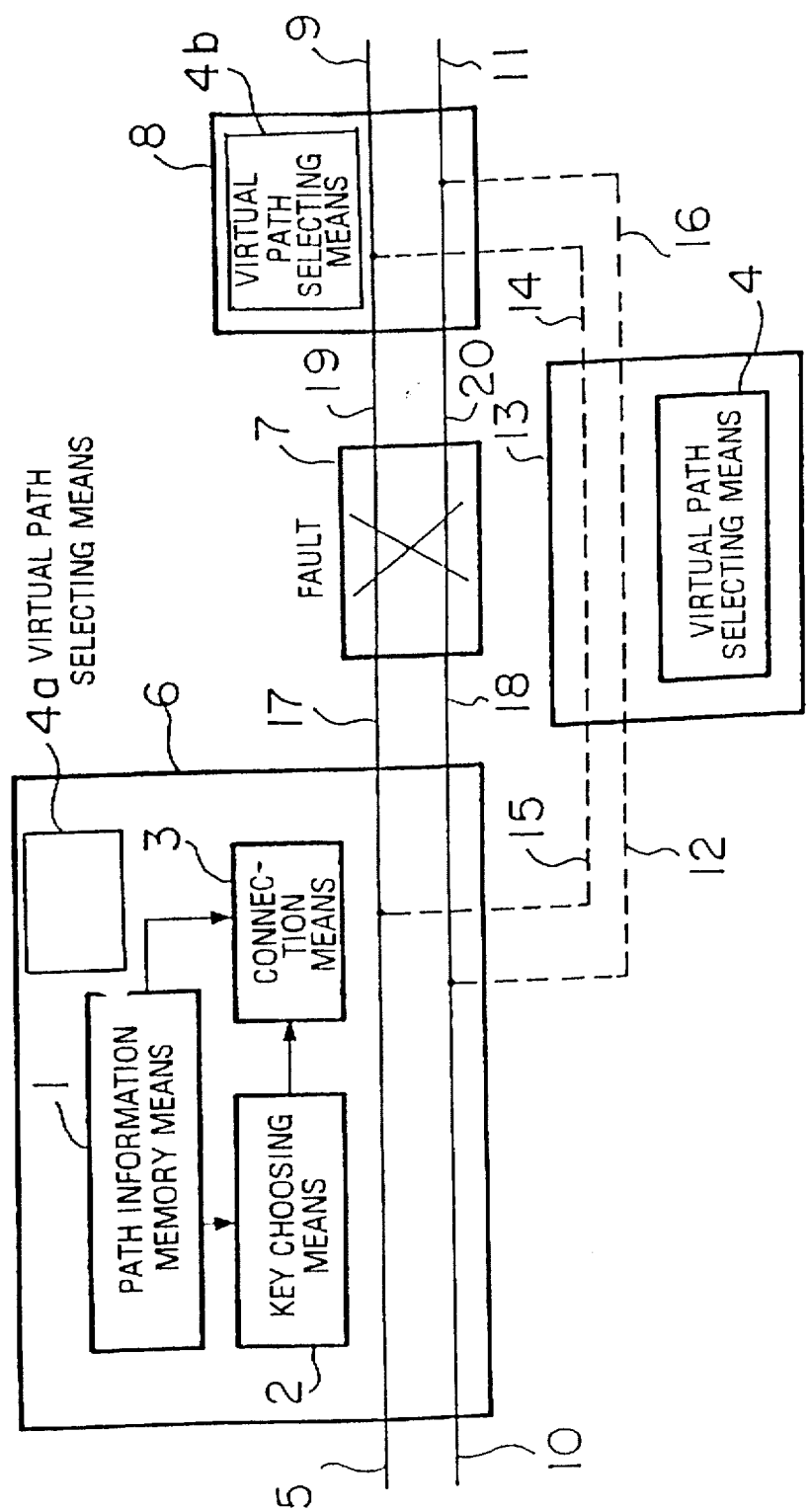
FIG. 1 is a conceptual view of the present invention.

FIG. 1 assumes the following situation. A first active route starts from a virtual path 5 and reaches a virtual path 9 via nodes 6, 7 and 8. A second active route starts from a virtual path 10 and reaches a virtual path 11 via the same nodes 6, 7 and 8. However, those first and second active routes has

4 failed due to a trouble happened in the node 7, and two bypass routes are now prepared for bypassing the failed routes. The first bypass route consists of a virtual path 15, a node 13, and a virtual path 14, and the second bypass route consists of a virtual path 12, the node 13, and a virtual path 16.

In the above-described situation, based on the path information of the first active route stored in the path information memory means 1, the key choosing means 2 in the node 6 chooses a virtual path 17 between the nodes 6 and 7 to be a sorting key for the first active route. Similarly, based on the path information of the second active route stored in the path information memory means 1, the key choosing means 2 chooses a virtual path 18 between the nodes 6 and 7 to be a sorting key for the second active 5 route.

Next, the two nodes 6 and 8, which are located at the ends of the failed routes, focus on the virtual paths 5, 9, 10 and 11 that were formerly the constituents of the failed routes and are now isolated from each other. The two nodes then connects the first bypass route with a pair of isolated virtual paths 5 and 9 having the sorting key for the first active route (i.e., the virtual path 17) in their path information. In a similar way, they connect the second bypass route with another pair of isolated virtual paths 10 and 11 having the sorting key for the second active route (i.e., the virtual path 18) in their path information.

As described above, because the two nodes 6 and 8 located at the ends of the failed routes carry out the path switching operations by using the sorting keys for tracking the missing routes, a plurality of paths can be simultaneously switched preserving a proper correspondence between them.

In addition to the path switching operations by the nodes 6 and 8, the virtual path selection means 4 in the node 13 selects one of the virtual paths interconnecting the node 13 and its adjacent nodes, based on the numerical order of the node identification numbers of all those nodes. To be more specific, when the node identification number of its own is larger than that of an adjacent node, the node chooses virtual paths among those linking to the adjacent node in descending order of their virtual path numbers. In reverse, when the node identification number of its own is smaller than that of the adjacent node, the node chooses virtual paths among those linking to the adjacent node in ascending order of their virtual path numbers.

Even though two processes for bypass route selection are started simultaneously from the both ends of the route, it is possible to avoid a problem of double selection of a single bypass route from happening and a plurality of virtual paths can be switched at a time preserving a proper path correspondence by carrying out the above path selection in reference to the signal direction.

Next, the details of the embodiment of the present invention will be described below.

Figure 2:
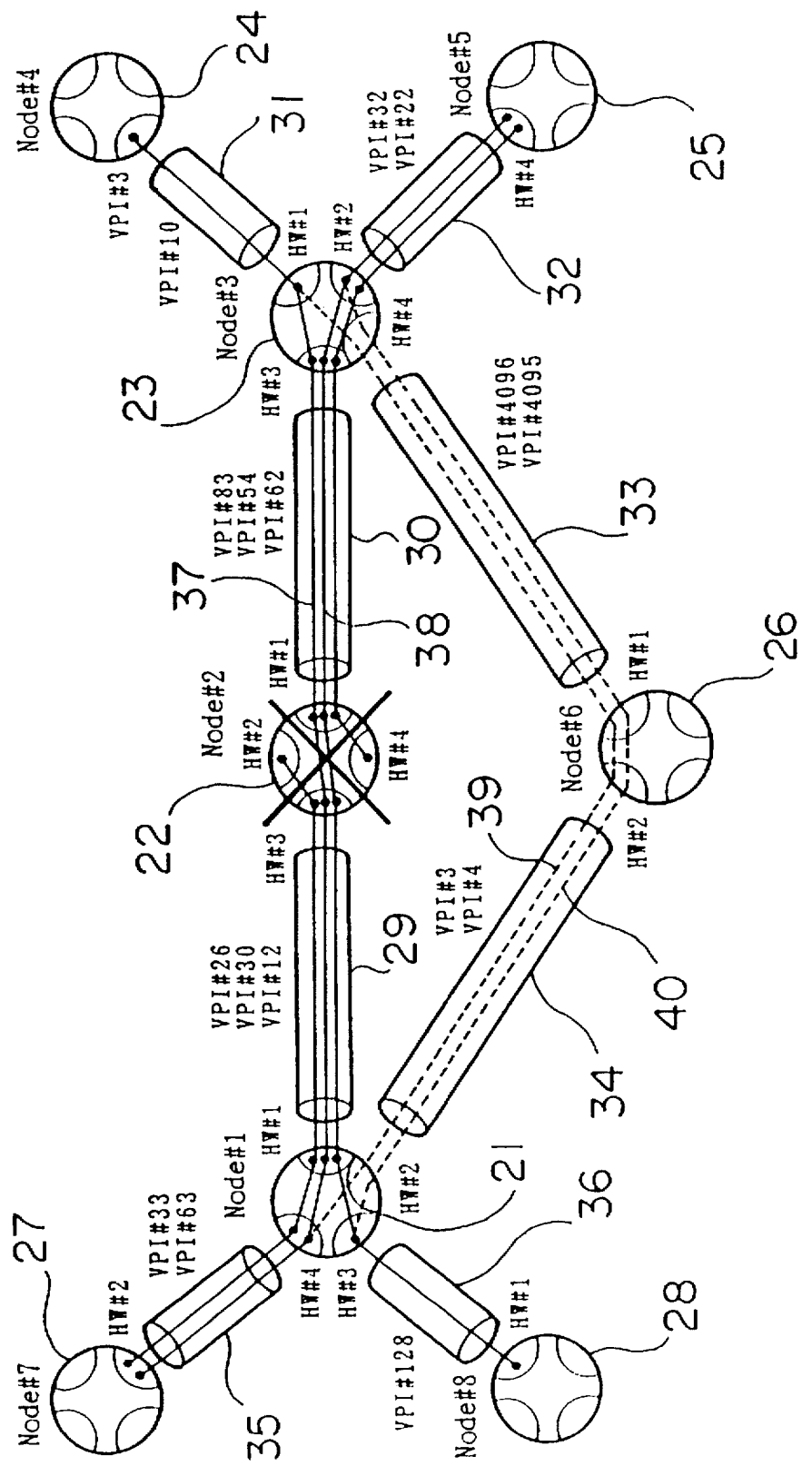
FIG. 2 shows an ATM network incorporating a path switching system according to the present invention.

FIG. 2 shows an ATM network which includes a path switching system according to the present invention. The ATM network is constituted by nodes 21 through 28, whose node identification numbers (or node numbers, shortly) are #1 through #8, respectively, and links 29 through 36 which interconnects the nodes. Respective links 29 through 36 contain a plurality of virtual paths and each virtual path is named with an identification number VPI (Virtual Path Identifier). Since a VPI has a one-to-one correspondence to a virtual path, it is sometimes used to refer to the virtual path itself. FIG. 2 shows that the node 22 has become inoperable and a bypass route is newly organized by the link 34, the node 26 and the link 33 in order to substitute a void route between the links 29 and 30 via the node 22.

Figure 3:
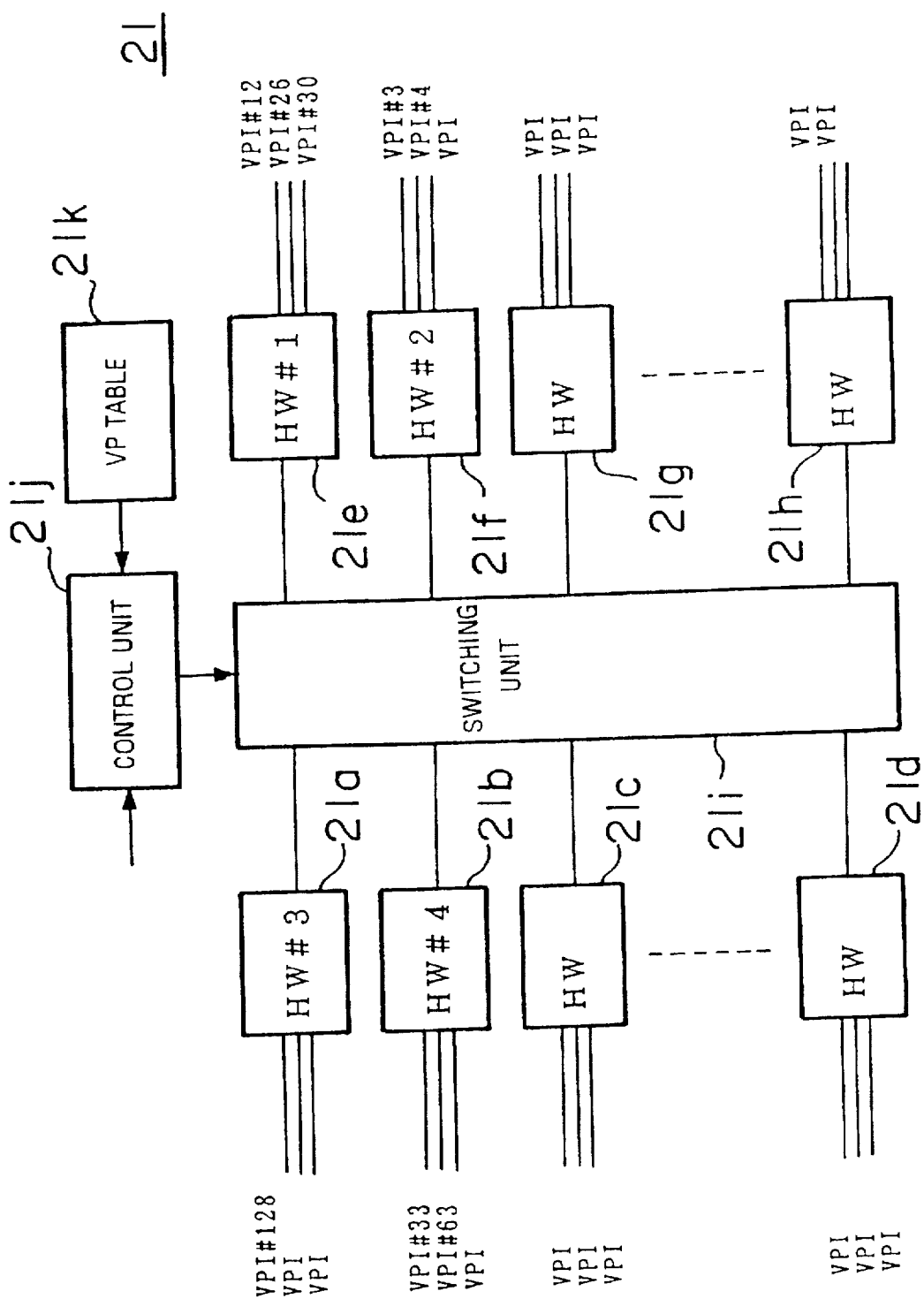
FIG. 3 illustrates an internal structure of a node.

FIG. 3 illustrates an internal structure of the node 21 for a typical example, while other nodes have basically the same structure.

In FIG. 3, the node 21 consists of a plurality of highway units 21a through 21h, a switching unit 21i, a control unit 21j, and a VP table 21k. The highway units 21a through 21h, to which a plurality of virtual paths are connected, provide optical interfaces to send/receive main signal cells. The switching unit 21i, under the control of the control unit 21j, assigns each input signal coming in to a highway unit through a certain VPI to an output signal going out from another highway unit to another VPI, thus performing so called cross-connections. The control unit 21j, being instructed by control signals received in message cells, operates the switching unit 21i for setting and switching the communications paths referring to the VP table 21k. This path switching operation will be described later with reference to FIG. 7. The VP tables, which store path information to describe interconnection of virtual paths, will be discussed below with reference to FIGS. 4 through 6 showing those in respective nodes including the VP table 21k in the node 21.

FIG. 4 shows the contents of a VP table 22k in the node 22. Since four active routes run through the node 22, the VP table in FIG. 4 has four entries of the path information. Each entry of the path information contains identification numbers of nodes and paths within a limited part of each route ranging from two nodes before to two nodes ahead of the node 22. For example, the second entry (particularly indicating the active path 37 in FIG. 2) of the VP table shown in FIG. 4 consists of the followings in a line: linkage information (X_7_2) in the node 27 located two nodes before, VPI (63) of the link 35 running two paths before, linkage information (4_1_1) in the node 21 located one node before, VPI (30) of the link 29 running one path before, linkage information (3_2_1) in the node 22 itself, VPI (83) of the link 30 running one path ahead, linkage information (3_3_1) in the node 23 located one node ahead, VPI (10) of the link 31 running two paths ahead, and linkage information (3_4_X) in the node 24 located two nodes ahead. Respective three components in each linkage information indicate a highway number (HW#), a node number (Node#) and another highway number (HW#), where a value X stands for no further linkage.

FIG. 5 shows the contents of a VP table 21k in the node 21 and FIG. 6 shows those of a VP table 23k in the node 23. Each table contains path information descriptive of path interconnection within two-node distance from each node. If a route ends within less than two-node distance, its table entry only contains a description of existing paths and nodes.

Figure 7:
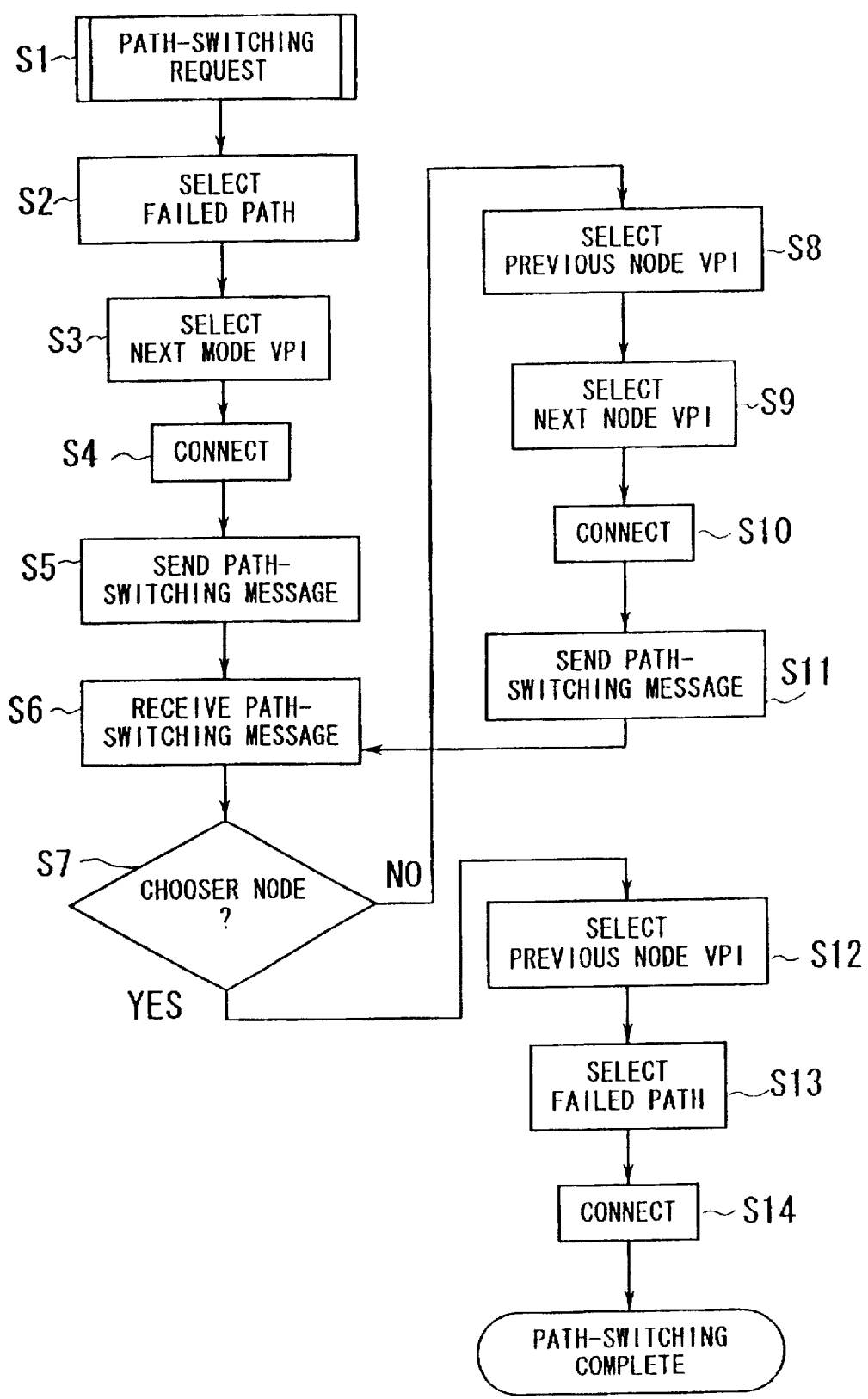
FIG. 7 is a flowchart describing a path switching procedure to be performed by a control unit in each node.

The following explanation will show how the control unit will switch the paths in the above-described structure with reference to FIG. 7.

FIG. 7 is a flowchart describing a path switching procedure to be performed by a control unit in respective nodes. This flowchart totally describes how the control units in the nodes located around the point of failure will work in response to a path switching request. The following description proceeds along the steps shown in FIG. 7.

[S1] A sender node receives a path switching request sent from a chooser node. As a matter of fact, several operations must be finished before reaching this step S1. They are: assignment of a sender node and a chooser node according to the point of failure, decision and reservation of bypass routes, and so on. Those preparatory operations are executed as well-described in the Japanese Patent Application No. H6(1994)-49554, "Ukaikeiro Tansaku Houshiki" (Bypass Route Searching System) invented by the same applicant as the present invention's. FIG. 2 exemplifies that the node 21 is assigned to a sender node because it detected the failure of the node 22, and the sender node 21 broadcasts a path-searching message so that the other nodes 22 through 28 will begin searching for some bypass routes to substitute the inoperable paths 37 and 38. This results in decision of two bypass route 39 and 40, passing through the link 34, the node 26, and the link 33, between the sender node 21 and the chooser node 23 which sits on the opposite side of the failed routes. Making reservations to use the bypass routes 39 and 40, the chooser node 22 then responds to the sender node 21 via the bypass routes under development. The sender node 21 recognizes this response of the chooser node 22 as a path switching request.

[S2] The sender node 21, in response to the path switching request, retrieves entries for the failed routes with reference to the VP table 21k of its own. That is to say, the sender node 21 extracts the second and third entries in the VP table shown in FIG. 5, and chooses the VPI#30 and VPI#12 as a first and a second sorting keys, respectively, which VPI's are of the virtual paths included in the failed routes that are linked to the sender node 21.

[S3] According to an order given by an alternative path selection algorithm, the sender node 21 selects alternative virtual paths from two free virtual paths VPI#3 and VPI#4, which lie between the nodes 21 and 26.

The alternative path selection algorithm of the present invention first compares node numbers of adjacent nodes and chooses alternative virtual paths from free virtual paths in descending order of their VPI's, when signals propagate from a node with a larger number to the next node with a smaller number. In reverse, when signals propagate in the opposite direction (i.e., from smaller to larger in node number), the alternative virtual paths are selected from free virtual paths in ascending order of their VPI's. In this example, since the node number #1 of the node 21 is smaller than #6 of the node 26, the first alternative virtual path is VPI#3 and the second is VPI#4.

[S4] The sender node 21 connects the virtual paths VPI#63 and VPI#128 to the first and second alternative virtual paths VPI#3 and VPI #4 selected in Step 3, respectively, wherein the virtual paths VPI#63 and VPI#128 (in the links 35 and 36) were formerly constituents of the failed route 37 and 38, and thus include in their VP table entries the first and the second sorting keys set in step S2, respectively. This step S4 consequently creates two sets of linkages, 63_(4_1_2)_3 and 128_(3_1_2)_4, being represented with VPI's and linkage information symbols.

[S5] The sender node 21 sends a path-switching message to the next node 26 on the bypass routes. The path-switching message contains the number of paths and node numbers on the bypass routes necessary for restoration, which are "two" and nodes (#1,#6,#3) in this case.

[S6] The next node receives the path-switching message from the previous node. It should be noted that there are two ways to enter this step as shown in FIG. 7. When entered here after step S5, the node 26 receives the path switching message from the sender node 21. When entered here after step S11, the chooser node 23 receives another path-switching message from the node 26, which case is to be described later.

[S7] It is checked whether the node that received the path switching message in step S6 was the chooser node 23 or not. If it was the chooser node 23, the next step is S12, and otherwise, S8.

[S8] According to the alternative path selection algorithm, the node 26 chooses the virtual paths VPI#3 and then VPI#4 which link to the previous node 21 on the bypass routes.

[S9] According to the alternative path selection algorithm, the node 26 chooses the virtual paths VPI#4096 and then VPI#4095 which link to the next node 23 on the bypass routes.

[S10] The node 26 connects the alternative virtual paths VPI#3 and VPI#4 selected in step S8 to the alternative virtual paths VPI#4096 and VPI #4095 selected in step S9, respectively. This step S10 results in two sets of linkages, 3_(2_6_1)_4096 and 4_(2_6_1) 4095, being represented with VPI's and linkage information symbols.

[S11] The node 26 sends the same path-switching message as that in step S5 to the chooser node 23 located next to it on the bypass routes.

[S12] According to the alternative path selection algorithm, the chooser node 23 chooses the virtual paths VPI#4096 and then VPI#4095 which come from the previous node 26 on the bypass routes.

[S13] The chooser node 23 retrieves the failed routes in reference to the VP table of its own. To be more specific, it extracts the first and second entries of path information which include the first and second sorting keys VPI#30 and VPI#12, looking up the VP table shown in FIG. 6.

[S14] The chooser node 23 connects the virtual paths VPI#4096 and VPI#4095 selected in step S12 to the VPI#10 and VPI#32, respectively, wherein the virtual paths VPI#10 and VPI#32 (in the links 31 and 32) were formerly constituents of the failed routes 37 and 38 found in step S13. This step S14 consequently creates two sets of linkages, 4096_(4_3_1)_10 and 4095_(4_3_2)_32, being represented with VPI's and linkage information symbols.

Figure 8:
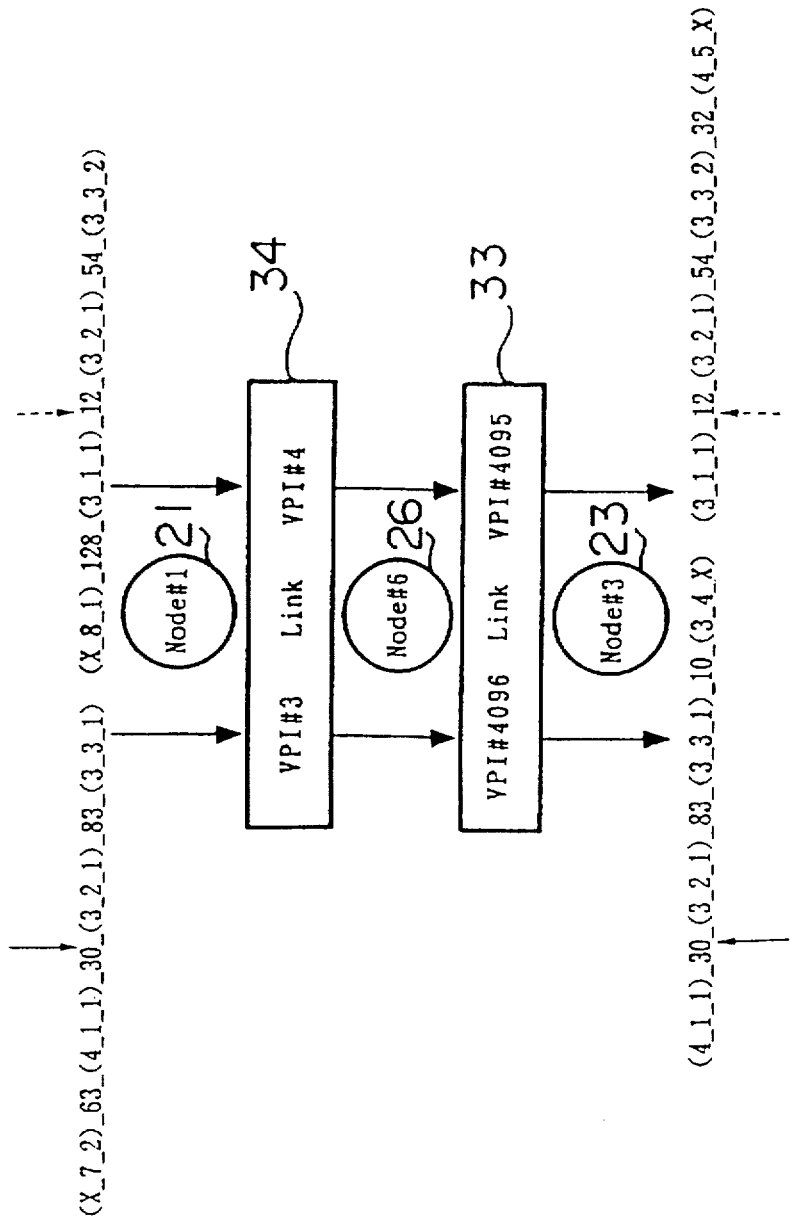
FIG. 8 illustrates sorting keys.

To summarize the above, steps S2 and S4 as well as steps S13 and S14 set at first the VPI#30 and VPI#12 as sorting keys and then connect the bypass routes to respective isolated paths with reference to the sorting keys as shown in FIG. 8, so that the former constituents having the same sorting key are connected to each other.

FIG. 2 shows that the bypass routes 39 and 40 have been successfully connected to the virtual paths VPI#10 and VPI#32 in the links 31 and 32, respectively. Possibility that the bypass routes happen to be inversely connected with the respective virtual paths is easily avoided by using the sorting keys. Since the VP table at each node contains path information descriptive of linkage structures within two-node distance therefrom, it is assured that the isolated routes share the same sorting keys.

Returning to FIG. 7, since steps S3, S8, S9, and S12 decide the order of virtual paths according to the alternative path selection algorithm in prior to connection of them, the virtual paths will never be cross-connected to each other in the middle of the bypass routes. Thus, as shown in FIG. 2, the bypass routes 39 and 40 reach the other ends without being twisted. In addition to this, such a thing cannot happen that the first bypass route is shared by two different routes at the both ends as shown in FIG. 11.

Figure 11:
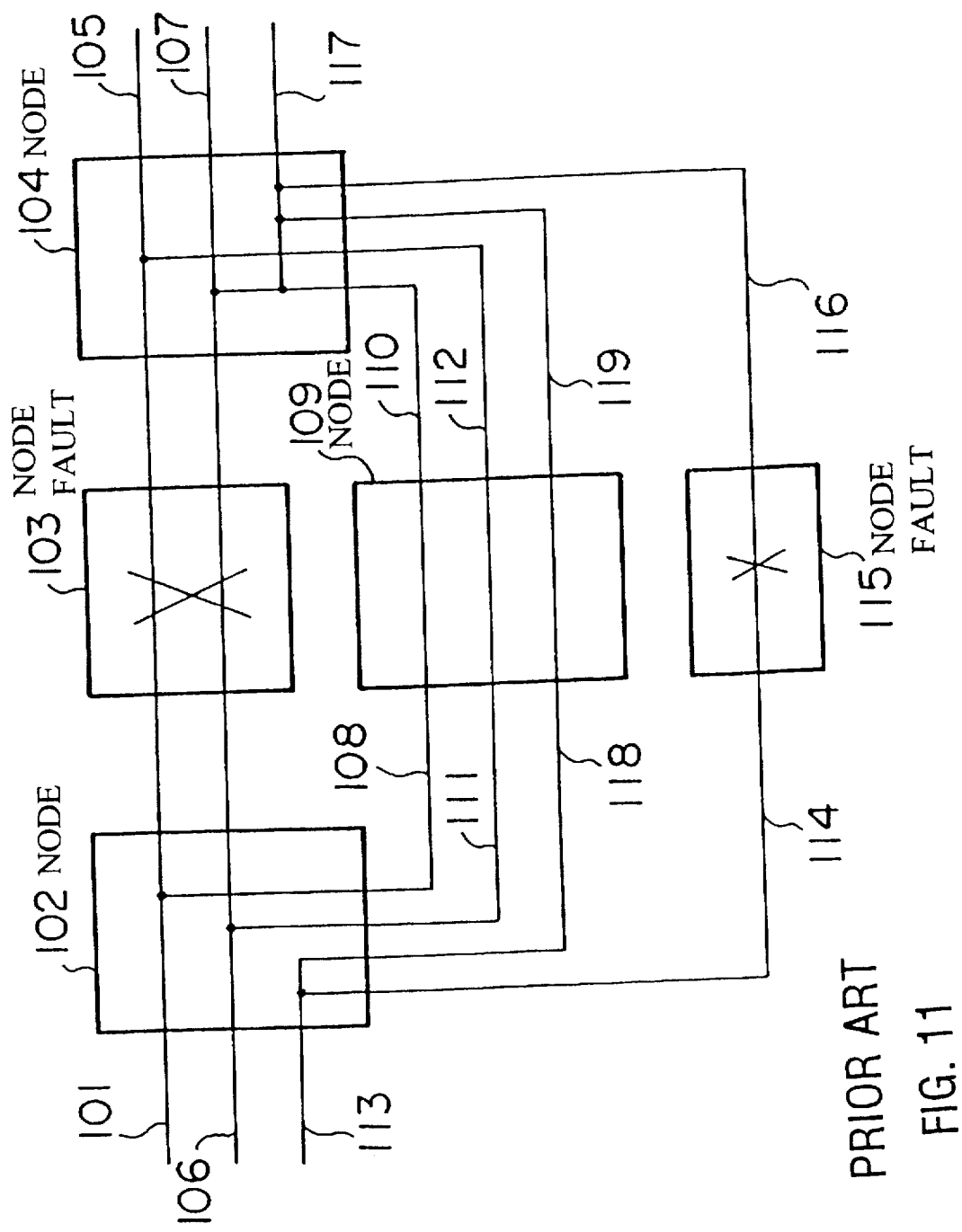
FIG. 11 is a diagram describing problems in a conventional method.

The method disclosed in the present invention can also be applied to the case of FIG. 11. When connections proceed from the left to the right in FIG. 11, the virtual paths are selected in the order of 110, 112, and then 119 according to the alternative path selection algorithm. On the other hand, when the connections proceed reversely from the right to the left, the order becomes such as 119, 112, and lastly 110. While the virtual paths 110 and 112 are used to bypass the first and second active routes, the virtual path 119 is naturally selected as an alternative path for the third active route because its connection process starts from the right hand for the third active route having the opposite signal direction. It will never cause a problem such that the same bypass route is simultaneously linked at the both ends to two different active routes.

The embodiment as described above has shown a system where a VP table in each node stores path information describing linkage structure within two-node distant therefrom and the recovery process is performed by a sender node and a chooser node which are adjacent to the failed node. The present invention, however, is not restricted in that embodiment, and rather, it is further applicable to a system where terminal nodes deal with a path failure recovery process to be described below.

Figure 9:
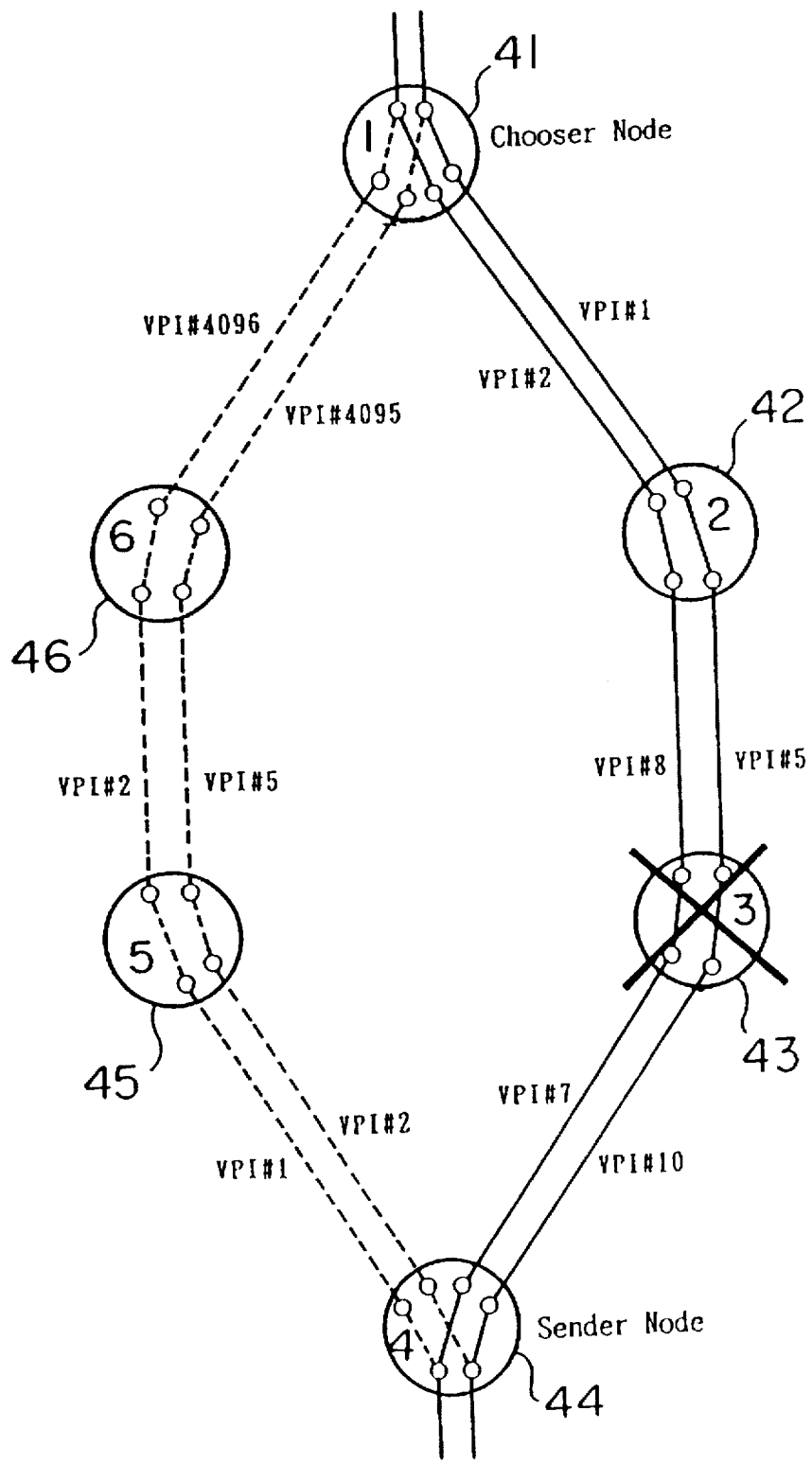
FIG. 9 illustrates a network adapting a path failure recovery method to be performed by two terminal nodes located at the ends of a route.

FIG. 9 illustrates a network adapting a path failure recovery method in which terminal nodes play a key role in the process. In FIG. 9 nodes 41 through 44 (node#1 through node#4) constitute two active routes where the nodes 41 and 44 are called the terminal nodes. The nodes 41 and 44 incorporates VP tables as shown in FIG. 10, each of which contain path information fully descriptive of the active routes from the node of itself to the other terminal node at the other end. Incidentally, FIG. 10 omits the highway numbers to simplify the description of linkage information in a node.

Again in FIG. 9, due to a failure occurred in the node 43, for example, the terminal nodes 44 and 41 became a sender node and a chooser node, respectively, and two bypass routes via the nodes 45 and 46 (node#5 and node#6) were subsequently prepared. The sender node 44 chooses VPI#7 and VPI#10 to be the sorting keys and connects the respective isolated paths to the virtual paths VPI#1 and VPI#2, before sending a path-switching message to the next node 45 located on the bypass route, wherein the message contains the number of alternative paths (three in this case) and the node numbers on the route (#4, #5, #6, and #1). The node 45 connects the virtual paths one after another in accordance with the alternative path selection algorithm in the same way as the first-described embodiment, and sends another path-switching message to the next node. The process repeats this until reaching the chooser node 41, where the isolated paths are connected to corresponding virtual paths in reference to the sorting keys. The bypass routes are thereby connected correctly as illustrated in FIG. 9.

In the second embodiment described above, the terminal nodes 44 and 41 store the end-to-end path information, which justifies settings of the sorting keys.

Both embodiments in this specification assumed that failure was in nodes, however, the present invention will provide a similar path switching process in case of failure in a link as well.

To summarize the above descriptions, according to the present invention, each node has path information descriptive of linkage structures at least within two-node distance therefrom and a specific node chooses sorting keys out of some constituent paths of the failed routes based on the path information. By using those sorting keys for tracking, the isolated routes regain connections to each other via bypass routes, where a plurality of paths are simultaneously switched preserving proper correspondence between the routes.

In addition, the present invention provides an alternative path selection algorithm for connection of virtual paths along the bypass routes. Even when the bypass route selections have started simultaneously from both ends of the routes, this algorithm prevents a double selection of a single route from happening.

It should be further noted that this process of simultaneous path switching with proper correspondence is triggered by a simple path-switching message whose data size is very small. The present invention requires only a few messages for controlling the whole process and thus enables fast path switching operations.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A path switching system for restoring a communications path that has been lost due to a trouble occurred in an ATM network including a plurality of nodes interconnecting a plurality of virtual paths, by connecting a pair of isolated routes via a bypass route that replaces a failed route which became inoperative due to the trouble, the path switching system comprising:

path information memory means disposed in each of the plurality of nodes for storing path information for an active route in service of communications, which is descriptive of a partial linkage structure within at least two-node distance from the node;

key choosing means disposed in each of the plurality of nodes for choosing one of constituents of the failed route as a routing key in reference to the path information corresponding thereto; and connection means, disposed in each of the plurality of nodes and activated in a pair of nodes located at both ends of the failed route, for finding one of the isolated routes whose path information stored in said path information memory means contains the routing key chosen by said key choosing means and for changing an interconnection between virtual paths so as to connect the bypass route to the isolated route that is found.

2. A path switching system according to claim 1, further comprising virtual path selection means, to be activated in every node on the bypass route, for selecting one of a plurality of virtual paths linking the node to an adjacent node, keeping a predetermined relationship between a first numerical order of identification numbers of the node and the adjacent node and a second numerical order of identification numbers of the plurality of virtual paths.

3. A path switching system according to claim 2, wherein said virtual path selection means performs selection of the virtual path depending upon a direction of signal propagation on the bypass route.

4. A path switching system according to claim 1, the system further comprising specifying means for specifying two nodes adjacent to a node on the active route when the trouble has happened in the node on the active route or in a link connected thereto, wherein said path information memory means stores the path information descriptive of a partial linkage structure within two-node distance from the node.

5. A path switching system according to claim 4, wherein said key choosing means chooses a virtual path, as the routing key, that is connected to one of the two nodes specified by said specifying means besides being a constituent of the failed route.

6. A path switching system according to claim 1, the system further comprising nominating means for nominating two terminal nodes located at the both ends of the active route as a sender node and a chooser node, when the trouble occurred in the part of the active route, wherein said path information memory means stores the path information descriptive of the linkage structure from the node to one of the terminal nodes corresponding thereto.

7. A path switching method for restoring a communications path that has been lost due to a trouble occurred in an ATM network including a plurality of nodes interconnecting a plurality of virtual paths, by connecting a pair of isolated routes via a bypass route that replaces a failed route which became inoperative due to the trouble, the method comprising the steps of:

(a) memorizing path information for an active route in service of communications, which is descriptive of a partial linkage structure within at least two-node distance from each node;

(b) choosing a routing key, in reference to the path information, out of constituent paths of the failed route; and (c) activating a pair of nodes located at both ends of the failed route for finding one of the isolated routes whose path information stored in said path information memory means contains the routing key chosen by said key choosing means and for changing an interconnection between virtual paths so as to connect the bypass route to the isolated route that is found.

8. A path switching method according to claim 7, further comprising the step of (d) making every node on the bypass route choose one of a plurality of virtual paths linking the node to an adjacent node, keeping a predetermined relationship between a first numerical order of identification numbers of the node and the adjacent node and a second numerical order of identification numbers of the plurality of virtual paths.

* * * * *